Patented Sept. 23, 1941

2,256,795

UNITED STATES PATENT OFFICE 2,256,795

MAGNESIA-LIME-SILICA REFRACTORY

Gilbert E. Seil, Cynwyd, Pa., assignor to E. J. Lavino and Company, Philadelphia, Pa., a corporation of Delaware No Drawing. Application February 6, 1941, Serial No. 377,665

11 Claims. (Cl. 106—58)

Neutral and basic refractories have found a wide application in industrial practice. This invention relates thereto generally and specifically to a stable high softening point silicate refractory material and to the production thereof, more especially refractories using magnesia-lime and silica starting materials. These fall generally into two main groups of which one is dolomite and the other is magnesite. The use of dolomite will be described first and there will be used the description found in my patent application Serial No. 195,869, filed March 14, 1938. It follows:

Dolomite contains, besides magnesia, a fairly large percentage of lime. And it is because of this lime, that so far as I am aware, no one has been able to make from deadburned dolomite a product that will not react with water, to be slaked or to be set by the water. The usual slaking or other reaction with the water is not always due to the free lime as it may also be due to the type of compound which the lime forms with the added starting materials. For instance, I have found that orthosilicates of lime, usually yielded by the starting materials, are normally affected by the presence of water or moisture. Orthosilicates of lime and magnesia that are not inert to water, such as merwinite, yielded by the starting materials when heated to a certain range of temperatures break up into calcium orthosilicate and monticellite.

This invention, therefore, is based upon the discovery, explained in my co-pending patent application Serial No. 122,786, filed January 28, 1937, now Patent No. 2,207,557, that if calcium orthosilicate be heated above a critical temperature, it becomes inert to the action of water. Also that at this critical temperature, or thereabove, merwinite breaks up into monticellite and calcium orthosilicate under conditions under which the latter is also inert to the action of water. A further discovery is that the normal tendency of calcium orthosilicate to revert to a different form is avoided if a stabilizing material be added thereto, such for instance, as phosphoric acid to the extent of 0.50% of the calcium orthosilicate present.

Therefore, in applying that knowledge to practice, calcium orthosilicate is heated to a temperature in a range above the critical temperature of 2950° F. and below 3888° F., since the latter is the melting or fusion point thereof. After being so heated, it is found to be inert to the action of water. This temperature is above 2725° F. at which calcium magnesium orthosilicate ($CaO.MgO.SiO_2$) melts or decomposes into calcium orthosilicate and magnesium orthosilicate, and the calcium orthosilicate is rendered inert to water, as above described. Merwinite, which is tri-calcium mono-magnesium orthosilicate ($3CaO.MgO.2SiO_2$), yielded by the starting materials at certain temperatures, is not inert to the action of water. Indeed, it has setting properties due to the hydration thereof by the water, and it decomposes slowly at about 3000° F. into monticellite and calcium orthosilicate in a form that is inert. Another stable orthosilicate, namely, magnesium orthosilicate ($2MgO.SiO_2$) melts at 3492° F. so it must be heated to a temperature in a range therebelow to render it also inert. Therefore, when heated to these decomposition and softening temperatures but below the temperature at which melting or fusion takes place, the resulting products are inert to the action of water.

In the prior art, it has been suggested that the addition of varying percentages of fluxing oxides, such as ferric oxide and aluminum oxide, be added to the dolomite to prevent its reaction with water, but without much success. But I have found that it is possible to treat the dolomitic starting material by adding only silicate to the dolomite. The silica is added in a quantity sufficient to convert all the lime to calcium orthosilicate with an excess of silicate added to convert a small portion of the magnesia to monticellite thereby utilizing a small amount of the lime which would normally be present as calcium orthosilicate if the silica were not added in excess. The slight excess of silica over that required to convert all the lime to calcium orthosilicate forms enough monticellite (which, as pointed out above, has a softening point of 2725° F.) to act as a bonding material when the mass is heated above the melting point of the monticellite. So, by this procedure a stable refractory material can be made from dolomite without requiring the addition of metallic oxides or fluxing oxides that are reducible by carbon or carbon monoxide.

Much work has been done in the refractory industry to correct the effect of monticellite in magnesite refractories. It is well known in the art that when sufficient lime (CaO) is present to convert all the silica to calcium orthosilicate, any of the orthosilicates of lime and magnesia thus yielded will react with the lime to form calcium orthosilicate, which is the only orthosilicate formed when there is enough lime present to take care of the silica. However, in actual practice, when there is an excess of lime over the amount necessary to form calcium orthosilicate, the finished refractory body is not inert to water. If, on the other hand, there is not enough lime to take care of the silica present in the burned magnesite or dolomite by the formation of calcium orthosilicate then monticellite forms. On a large scale production, using natural minerals as raw materials, it is almost impossible to prepare a starting material so that each and every portion of it shall have the proper amount of lime and silica to unite to form nothing but calcium orthosilicate. For this reason I have experimented, as explained in the co-pending application, Serial No. 123,603, filed February 2, 1937, now Patent No. 2,206,131, to find another method for correcting the deleterious effects of the monticellite in magnesia refractories where the magnesia content is between certain limits, and I have accomplished this correction by dispersion in, or bolstering with, forsterite.

In that patent I show that the deleterious effect of monticellite in magnesite refractories can be overcome by dispersing the monticellite in relatively large amounts of forsterite. Therein, it is explained that the forsterite can be formed by the addition of finely ground silica to granular commercial deadburned magnesite in such a way that a refractory is attained which, instead of showing deformation under load at 2500° F. or 2600° F., does not deform at 3000° F. under a load of 25 pounds per square inch. But by the practice of the present invention, the monticellite is dispersed in relatively large amounts of calcium orthosilicate, and the monticellite is deliberately formed in the body so that a bonding material is present during the burn, the deleterious effect of which is completely removed by reason of its dilution throughout the calcium orthosilicate. So a small amount of monticellite is purposely added to the calcium orthosilicate, first, to insure the conversion of all the lime to calcium orthosilicate and, second, so that the calcium orthosilicate and periclase can be bonded at attainable temperatures without causing deleterious characteristics to be exhibited by and properties to reside in the finished product.

It is, therefore, important to add to a dolomite starting material the silica necessary to correct all the lime present to calcium orthosilicate. This is done by taking the percentage of lime in the raw rock and multiplying by .536 to determine the exact amount of silica necessary for calcium orthosilicate. For each percent of monticellite required an additional 0.15% of silica is added. In other words if I wish to add 5% of monticellite I add 0.75% more silica than is required for the conversion to calcium orthosilicate. If I wish 10% of monticellite I add 1.50% of silica beyond that required for the conversion of the lime to calcium orthosilicate. If 15% of monticellite is desired, then 2.25% of silica is added beyond that required for the formation of calcium orthosilicate from the lime present. All these percentages are based upon the final burned weight, and are percentages of the finished refractory.

Although it is impossible to procure pure dolomite commercially, it is possible to procure dolomites with very small amounts of impurities other than silica. Pure dolomite contains:

| | Per cent |
|---|---|
| CaO | 30.4 |
| MgO | 20.9 |
| CO$_2$ | 47.7 |

An analysis of a commercial grade of dolomite contains:

| | Per cent |
|---|---|
| CaO | 30.13 |
| MgO | 22.13 |
| SiO$_2$ | 0.68 |
| Al$_2$O$_3$ | 0.14 |
| Fe$_2$O$_3$ | 0.39 |
| CO$_2$ | 46.82 |

In calculating the amount of silica used with this dolomite, the percentage of lime (30.13%) multiplied by .536, which is 15.55, equals the number of pounds of silica required to convert all the lime in 100 pounds of dolomite to calcium orthosilicate. From this 0.68 pound are deducted, because this amount is already in the crude material, leaving 14.87 pounds of silica to be added to 100 pounds of the crude rock to form calcium orthosilicate without the presence of any monticellite. Therefore, to 100 pounds of commercial dolomite 14.87 pounds of silica are added. On ignition the 114.87 pounds of mixture will yield 68.05 pounds of material. If it is desired to have 5% of monticellite, silica equal to 0.75% of this weight is added. If 10% of monticellite is desired, twice as much silica is added, etc.

I have found that the maximum amount of monticellite required for bonding purposes in the finished shaped refractory is 15%, and this is only required in cases where relatively low burning temperatures are to be used. The invention, therefore, covers a refractory containing:

By chemical analysis:

| | Per cent |
|---|---|
| CaO | 42 to 44 |
| SiO$_2$ | 23 to 26 |
| MgO | 32 to 34 |
| Fe$_2$O$_3$, Al$_2$O$_3$ and P$_2$O$_5$ combined | Under 3 |

By mineralogical analysis:

| | Per cent |
|---|---|
| Calcium orthosilicate | 55 to 67 |
| Periclase | 28 to 34 |
| Monticellite | 1 to 15 |

By molecular analysis:

| | Molecules |
|---|---|
| Lime | 2 |
| Silica | 1.01 to 1.15 |
| Magnesia | 2.11 |

After the materials have been finely ground and thoroughly mixed in the dry state they are burned to a temperature of at least 2950° F. for a period in excess of 24 hours, or to a temperature of 3200° F. for a period of four hours, or to a temperature of 3400° F. for a period of one hour to insure the conversions herein specified. After the material has been burned on the time-temperature cycles shown, it is properly sized in accordance with recognized procedure for the manufacture of refractory bodies, is pressed in the orthodox fashion, and burned preferably in a tunnel kiln, at a temperature depending upon the percentage of monticellite in the body, and preferably between 3000 and 3200° F.

However, I have found that dolomite corrected with enough silica to form as much as 1% of monticellite is too refractory for bonding in commercial equipment. Material of this type that does not contain any added fluxing oxide, such as iron oxide or aluminum oxide, will not bond satisfactorily at 3200° F. I have found that whereas dolomite corrected with added silica, but without the addition of such so-called fluxing oxides, bonds easily at 3200° F., it does not produce satisfactory brick if both the grog and the bond are prepared from the same material. I have found that when the coarse portion of the brick mix or the grog is prepared from material containing only 1% of monticellite and the fine material is prepared from corrected dolomite containing of the order of 15% of monticellite in such proportions to yield a product with predetermined percentages of monticellite, such as 2½%, 5%, 7% or 10%, depending upon the service to which the brick is to be subjected, a satisfactory refractory brick is produced. So this forms an important aspect of this invention.

As a specific example—I take crude dolomite containing

| | Per cent |
|---|---|
| CaO | 29.34 |
| MgO | 22.16 |
| $SiO_2$ | 1.29 |
| $CO_2$ | 47.21 | and add sufficient silica to produce 1% of monticellite. This requires 15.84# of silica to each 100# of the dolomite, and inasmuch as 100# of all the original dolomite contains 1.29# of silica, the addition required is 14.55# of finely ground silica. This material is then burned to a dense clinker at temperature of at least 3200° F. to insure complete conversion to stable calcium orthosilicate in the presence of 0.5% of oxide of phosphorus. After it has been cooled, it is sized by any of the known methods so that the product is seven or eight mesh with a minimum of fines. As this product has relatively little of the lower softening point ingredient—monticellite—it is in effect a very high softening point material.

Another product of lower softening point is then produced from the same dolomite which contains considerably more of the lower softening point ingredient—monticellite, namely, 15%. This product must contain, after burning, 17.70# of silica to 100# of starting crude dolomite. Inasmuch as crude dolomite already contains 1.29# of silica, it is necessary to add 16.41# of silica to the crude dolomite and then burn it to a temperature (approximately 3200° F.) to insure complete conversion to calcium orthosilicate and monticellite. Care must be taken in the burning of the higher softening point material and of the lower softening point material to attain a temperature which will assure that the lime and silica combine to form calcium orthosilicate and monticellite and not other orthosilicates of lime and magnesia, not one of which is stable at the higher temperatures. The mixture prepared for the preparation of deadburned corrected dolomite, containing 15% of monticellite, is then ground so that it contains sufficient fine material when mixed with the high softening point corrected dolomite, containing approximately 1% of monticellite, so that the mesh ratio is that required for the manufacture of a refractory brick suitable to the service to which it is to be subjected.

I find it preferable to mix the coarse, high softening point material and the fine, lower softening point material in the dry state before they are tempered with water and whatever temporary or chemical bonds are to be used. I do this because I have found by experience that it is impossible to wet the materials before mixing and get even distribution when the dry-press process is to be employed in the manufacture of brick.

After the material is mixed in the dry state, it is then taken to the tempering pans where sufficient water and glutrin or boiled starch, or a similar temporary bond, is added. If the brick is to be used in the unburned state, some chemical is added which contains the chloride or sulphate radical (of which as examples are mentioned magnesium chloride and magnesium sulphate) in such a state of chemical combination that it will combine with the periclase present and yield a magnesium oxy-acid bond such as magnesium oxy-chloride or magnesium oxy-sulphate. The brick are then pressed in the usual manner either using a hydraulic, lever, or vibrating press. The brick are dried and, if they are to be shipped in the unburned state, are ready for shipment. If, however, they are to be burned they are set either in a periodic kiln or on cars to be burned in a tunnel kiln and are then fired to a temperature above 3000° F. I prefer to burn the brick at a temperature of approximately 3200° F.

*Analyses*

| | Higher softening point grog | Lower softening point bond |
|---|---|---|
| | Percent | Percent |
| CaO | 43.56 | 42.33 |
| $SiO_2$ | 23.48 | 25.49 |
| MgO | 32.00 | 31.18 |
| $R_2O_3$ | 0.46 | 0.50 |
| $P_2O_5$ | 0.50 | 0.50 |
| Calcium orthosilicate | 65.56 | 56.23 |
| Monticellite | 1.00 | 14.70 |
| Periclase | 32.43 | 28.07 |
| $P_2O_5$ | 0.50 | 0.50 |
| Undetermined | 0.51 | 0.50 |

By preparing the materials as I have described, and by treating them in the above manner for the manufacture of brick, I obtain a finished refractory far superior to one from corrected dolomite all of which has been corrected by the same addition of silica and all of which contains the same percentage of monticellite. By this method I obtain a refractory whose grog has an exceedingly high temperature softening point and which is completely enveloped or surrounded and sealed by films of periclase combined with orthosilicates of lime and lime-and-magnesia in such a way that the softening point of the lower temperature softening bonding material is raised by reacting with the surfaces of the very high softening point corrected dolomite.

But to go on with the explanation of this invention: let us assume that it is wished to manufacture a refractory containing between five and six percent of monticellite. If the starting material is prepared so that all the material has between five and six percent of monticellite in it, then it would require an exceedingly high temperature to burn a finished brick in order to bond it properly. However, if there is used a grog material containing 1% of monticellite as two-thirds of the finished brick, and then very finely ground one-third of material containing 15% or thereabouts of monticellite, after proper mixing and pressing such a brick can be burned at a temperature possibly three to four hundred degrees lower than the first example and will form a finished refractory having novel and superior characteristics.

So, although the material containing 15% of monticellite in itself might not be suitable for the manufacture of brick for certain service, its use in the manufacture of brick, by the example cited, decreases the difficulty of manufacture, furnishes a better finished product and allows the operator to place the monticellite in very thin films so that its deleterious effect is minimized in the finished product.

What actually takes place seems to be that grains of grog or grog particles or crystals, are encased in thin films of quicker softening material, so infinitesimally thin, however, that there is little tendency toward interfacial slip or displacement even when the softening range of temperatures is approached. More particularly, grains of grog material each made up of a multiplicity of crystals, are not embedded in a matrix of quicker softening bond (such as peanuts in peanut brittle) but are each enveloped in a thin envelope (as in a candy bar of peanuts). A matrix presents too great concentrations of quicker softening material than can soften and permit the grains to slip or move relative to each other. As opposed to this, the thin envelopes (1) permit the grog grains to lie closer together like the marble pieces of a mosaic and the bond like the cement thereof so that there is a minimum of bond present, and (2) discourage any detrimental concentration of bond therebetween. By keeping down such concentrations and making a mosaic formation of the grog grains, the softening point of the bonding material is in effect thus raised by means exterior of the bond. In other words, heat seems to be transmitted by the bond envelopes to the grog grains (that can withstand it) rather than being retained by the bonding envelopes that could not without being so placed and arranged.

In explanation of the term "softening point" used herein, it should be recalled that a pure crystal has no softening point. However, a body composed of a mixture of crystals having different melting points will have points of softening as the different crystals begin to melt. Further, the melting of one or more crystals in a body composed of a combination of crystals may cause chemical reactions between the crystals which have become molten and the crystals which have not become molten. As a result of these reactions, glasses may be formed which, being non-crystalline, will have softening points in contra-distinction to melting points or new crystals having either higher or lower melting points than the reacting crystals may be formed.

The philosophy behind this information is the desirability of making a brick in which the grog material, being practically pure crystals of calcium orthosilicate and periclase, has a predictable melting point which melting point is, of course, considerably beyond the temperature range to which the brick will be subjected. The difficulty with preparing a brick entirely from such a material lies in the fact that it is so difficult to melt at commercially economical temperatures and that because of this property there will be no bonding interface to hold the grog particles together.

Therefore, to a grog prepared as above I add a given percentage of a similarly prepared material but with a larger proportion of the lowest melting point constituent; in this case monticellite. When the mixture is heated to temperatures in the ranges reached in the specifications and which are commercially economical to attain, the lowest melting point crystal will melt and provide a fluid interface which binds the grains of grog together on cooling. Further, this fluid interface will react with the grog so the final product has less of the low melting point constituent than had the bonding starting material.

In explanation of the term "bonding" used herein, it is important not to confuse the amount of monticellite necessary for satisfactory bonding of the finished shaped refractory with the requirements for providing a dense hard clinker. In other words, a satisfactory clinker can be made from a mixture in which there will be only one percent of monticellite. When this clinker is used to manufacture brick, it is necessary to burn the shaped brick at an extremely high temperature in order to provide a satisfactorily bonded brick. It should be clear that the mixture will clinker properly with the extremely low percentage of monticellite and that the clinker obtained will have sufficient strength (that is, bond) to yield, when crushed, the hard dense grog called for herein. If the material did not have sufficient bond to yield such a clinker, the resulting product would be a powder which would not answer the purpose of this invention, so no confusion should exist between the "bond" needed for the development of clinker and the "bond" needed in the finished refractory.

Having now described the treatment of dolomitic starting material, I set forth here following a description of my treatment of magnesitic starting material, that is copied from my patent application Serial No. 221,734, filed July 28, 1938, and allowed December 11, 1938.

At the present time magnesia refractory materials are usually prepared from natural $MgCO_3$ or from other natural or chemically produced compounds which, on being sufficiently heated, yield a product which is principally crystallized magnesium oxide or periclase. The starting material is preburned to a temperature at which the carbon dioxide or other volatile materials are driven off and at which the magnesia is crystallized. The material thus prepared is cooled and the clinker is used as such in the metallurgical industry or crushed for the manufacture of refractory shapes such as brick, which may be kiln fired or chemically bonded, and used in the construction of metallurgical furnaces.

Depending upon the composition of the starting material and upon the temperature and the method of treatment, the clinker will consist mainly of periclase containing absorbed iron oxide, and smaller amounts of crystals such as magnesium orthosilicate ($2MgO.SiO_2$), calcium orthosilicate ($2CaO.SiO_2$), and calcium magnesium orthosilicate (monticellite — $CaO.MgO.SiO_2$). Various glasses may also exist in the clinker. The refractory qualities of the clinker are dependent upon the composition, the quantity, and the distribution of the minor constituents. The refractory qualities of the body eventually formed from the clinker are dependent upon the composition and especially upon the distribution of the secondary components formed when the clinker is heated to elevated temperatures.

When the clinker is produced from natural magnesite its composition is, of course, determined by the composition of the material as mined. When the as-mined material is of a high standard of purity, clinkers of desired compositions are made by blending with the high grade magnesite various additives and correctives before the calcining operation. The clinker obtained by this process is non-uniform in that it varies from piece to piece. Under the conditions of manufacture variation is unavoidable because of the difficulty in obtaining an absolutely uniform distribution of the various components of the mix and because the magnesite itself varies from mine to mine and from section to section in the same mine. The variation from piece to piece in the composition and in the refractory qualities of clinker made from natural magnesite is an advantageous factor when the clinker is used for furnace bottoms, for burned-in monolithic linings, for burned-in furnace repairs, and in other installations where the material is formed in place in the furnace and then burned into a dense compact body. In the burning in of a furnace section formed from clinker made with natural magnesite, the less refractory particles of clinker fuse at relatively low temperatures, and serve as a bond for the more refractory particles, holding them in position, and forming eventually a uniform refractory body.

In the preparation of chemically produced magnesia refractory materials the non-uniformity of the clinker produced from natural starting materials is eliminated. By chemical processes uniform clinker of pure crystallized magnesia or a uniform clinker of any desired analysis can be made. Pure crystalline magnesium oxide, however, has a low load carrying capacity at high temperatures due to the fact that the crystal cleavage of the periclase permits slippage in the crystals under load at high temperatures. The presence of bonding crystals to prevent slippage along the cleavage planes is very desirable in magnesia refractories. As I have pointed out deadburned magnesia has a wide range of uses in metallurgical plants. It is used as a construction material for furnace bottoms and furnace walls, and as repairs to the furnace structure. The qualities desired in the magnesia material vary with the service to which it is to be subjected, thus a material suitable for forming monolithic side walls in an electric furnace, where exceptionally high temperatures are reached and where the material is subjected to the furnace atmosphere and possibly to attack by molten slags, must have different characteristics than material intended for making an open hearth bottom where different conditions of temperature and service exist. Material intended for making hot repairs would vary in composition from either of the above materials.

I have found that when a magnesia refractory material of uniform composition is used, for example in the making of repairs to a furnace wall, difficulties are encountered because no bonding in the repaired section is obtained until a temperature high enough to fuse the lowest melting point pieces of the magnesia clinker is reached. Inasmuch as the repaired section must attain some strength at relatively low temperatures, it is necessary to sacrifice refractoriness in order to obtain a low temperature bonding action. If a material of sufficient refractoriness is used, there is no bonding action at low temperatures and the repair is frequently lost before its cost has been realized.

My invention is based upon the discovery that a uniform body of the same eventual composition and characteristics can be obtained without loss of bonding qualities at low temperatures, and without the sacrifice of refractoriness at high temperatures by using a mixture of two intermediate magnesia refractory materials, one having very high refractory qualities, and one of relatively lower refractoriness. The fusion of the lower melting part of the mixture bonds the more refractory part of the mixture, and the eventual result is a uniform body which has maintained its strength throughout the heating range, and with which the danger of loss is minimized. I have found it preferable to use a smaller percentage of the lower fusing material, and I have found it advantageous to have the lower fusing material smaller in average particle size than the more refractory material.

To explain the present invention as applied to magnesite, I am tabulating below the chemical and the petrographic analyses of several magnesia refractory materials. These examples are purely illustrative of the invention and do not in any way limit its scope. In considering the examples, one must bear in mind that the melting point of forsterite is 3434° F., of calcium orthosilicate, 3866° F., while monticellite is formed by fusing its components at 2714° F., and decomposes into calcium orthosilicate and forsterite at 2728° F. The melting point of periclase is above 5000° F. Because of their high melting points periclase, calcium orthosilicate, and forsterite may be considered refractory components of the body formed, while monticellite, having a low fusion point and low decomposition point acts as a secondary or bonding component.

*Chemical analysis*

| | Material No. | | | | | | | |
|---|---|---|---|---|---|---|---|---|
| | 1 | 2 | 3 | 4 | 5 | 6 | 7 | 8 |
| | Per cent | Per cent | Per cent | Per cent | Per cent | Per cent | Per cent | Per cent |
| $SiO_2$ | 0.75 | 0.90 | 5.00 | 14.92 | 5.76 | 11.52 | 38.39 | 42.69 |
| $Fe_2O_3$ | 0.25 | 0.25 | 0.25 | 2.22 | 0.25 | 0.25 | | |
| $Al_2O_3$ | 0.50 | 0.50 | 0.50 | 1.01 | 0.50 | 0.50 | | |
| $CaO$ | 1.40 | 1.40 | 1.80 | 1.26 | 5.37 | 10.74 | 35.84 | |
| $MgO$ | 97.10 | 96.95 | 92.45 | 79.81 | 88.12 | 76.99 | 27.55 | 57.31 |

*Petrographic analysis*

| | Material No. | | | | | | | |
|---|---|---|---|---|---|---|---|---|
| | 1 | 2 | 3 | 4 | 5 | 6 | 7 | 8 |
| | Per cent | Per cent | Per cent | Per cent | Per cent | Per cent | Per cent | Per cent |
| Periclase | 97.00 | 96.75 | 90.00 | 63.00 | 84.25 | 69.25 | | |
| Calcium orthosilicate | 2.25 | 1.50 | | | | | | |
| Monticellite | | 1.00 | 5.00 | 3.50 | 15.00 | 30.00 | 100.00 | |
| Forsterite | | | 4.50 | 30.00 | | | | 100.00 |

Material No. 1, having no low melting point components, might be used as a refractory material, but it can be burned to a monolithic mass only at very high temperatures. Material No. 2, having slightly more silica and, therefore, containing a small amount of monticellite, can be bonded with less difficulty, but the temperature required for bonding this material is still too high to permit of wide commercial application. In Material No. 3 we have a composition which does find considerable use in metallurgical structures. This material contains 5% of bond and although difficulty is encountered in bonding it for certain purposes, such as rammed repair work, it can be used, for example, to manufacture brick. Material No. 4 containing approximately 15% of silica is made in accordance with my co-pending application, Serial No. 123,603 which I have previously described. This composition, like the previous ones, is excellent in the finished body, but in this material the bonding effect of the monticellite is minimized because of its dispersion in approximately ten times its weight of forsterite. The material, therefore, would find only a limited usage as clinker for hot furnace repairs, or for rammed-in linings. Materials No. 5 and No. 6 containing 15% and 30% of monticellite, respectively, can be bonded into a dense body at relatively low temperatures. The resulting bodies, however, do not have sufficient refractoriness to permit of wide application in metallurgical furnaces. Either of these materials mixed with definite proportions of Materials No. 1 or No. 2 yield a clinker in which there is some low fusing material to act as a bond holding the highly refractory material in position until a dense, uniform body is obtained. To show the limits to which the composition can be varied, I have included in the tabulation Materials No. 7 and No. 8, which are monticellite and forsterite, respectively.

I have found that a magnesia refractory body containing approximately 90% of periclase and 5% of monticellite is well adapted to many commercial applications. To form this body, I take a mixture composed of 5 parts of Material No. 1 and 1 part of Material No. 6, both in clinkered form, but with Material No. 6 preferably a little finer than Material No. 1. As an example of the method of practicing the invention, the mixture is used for a rammed-in repair in a metallurgical furnace. After drying, the repair is burned-in by gradually raising the temperature until working temperatures, or slightly higher temperatures, are attained. During the burning-in process, Material No. 6 will fuse at a relatively low temperature, bonding the more refractory Material No. 1 until a dense body is formed. The dense body will then contain about 5% of monticellite, and will be approximately the same in composition and in characteristics as though it had been made from a uniform clinker containing 5% of monticellite. The advantage of using the mixture of clinkers lies in the fact that there has been a bonding action in the body during a considerable portion of the burn and because of this bonding action the danger of losing the repair before its value has been realized is very largely eliminated. The same body would be formed if I used a mixture composed of 2 parts of Material No. 1 and 1 part of Material No. 5, but in this case the bonding action due to the fusion of the lower melting point particles would be manifested at a higher temperature.

The combinations which can be obtained by using various proportions of any two of the materials shown in the tabulation permit the production of bodies having any of the normally desired compositions in regard to monticellite (that is bond) or having any of the normally desired refractory characteristics.

Although in the examples given I have shown monticellite as the low fusing component of the magnesia refractories, the results can be obtained by using fluxing oxides which form low melting point compounds in the material. Such fluxing oxides are iron oxide, alumina, and chromic oxide.

Low iron magnesia refractories are preferable in some metallurgical processes, such as in copper smelting where contamination of the product with iron is avoided as much as is practically possible. The presence of iron as magnesium ferrite in chemically produced magnesia clinker, within the limits to which iron is often contained in natural deadburned magnesite, that is, up to approximately 8%, does not effect the practice of this invention since magnesium ferrite having a high melting point can be considered a refractory crystal.

The main distinction between the treatment of dolomite and magnesite resides in the difference in the amounts of calcium orthosilicate formed in the two different end products. When dolomite is used, major percentages of calcium orthosilicate are formed, whereas, when magnesite is treated, the percentage of calcium orthosilicate formed is minor and indeed quite small. The reason for this is that in dolomite there is much more lime to be combined with silica than in magnesite.

I claim:

1. The process of making refractory material which comprises treating separately two batches of magnesia-lime and silica starting materials, heating each batch to yield a clinker comprising at least periclase plus calcium orthosilicate from one batch and a clinker from the other batch comprising at least periclase plus monticellite, mixing proportions of each batch of clinker so that in the mixture there is the desired percentage of periclase, calcium orthosilicate and monticellite desired for service purposes, and firing said mixture.

2. The process of claim 1 with the additional step of ultimately firing the mixture to a temperature above the fusing point of monticellite to yield a refractory comprising grains of periclase and of calcium orthosilicate bonded by monticellite fused in situ on said grains.

3. The process of claim 1 with the additional step of causing to be present in the batches phosphoric acid at the reaction temperature of at least 2950° F.

4. The process of claim 1 with the additional steps of pressing the mixed material into shapes, and ultimately firing the shapes to a temperature of at least 2950° F.

5. The process according to claim 1 wherein the mixing of the batches takes place in a dry state.

6. The process of making a refractory which comprises heating separately two batches of materials containing essentially calculated amounts of dolomite and silica to a temperature of at least 2950° F. until there is yielded from each batch grains of periclase and calcium orthosilicate bonded by monticellite formed and fused on the grains in situ without residual free lime or silica, calculating the starting materials of each batch so that in one there results a greater percentage of monticellite than in the other, separately grinding and screening the batches to a predetermined mesh size, and mixing together a quantity of each batch of ground and sized material.

7. The process of claim 6 with the additional step that the batch having the lesser percentage of monticellite is ground and screened to a finer particle size than the other batch.

8. The process of making a refractory material which comprises adding to dolomite sufficient silica to convert all the lime present to calcium orthosilicate and a controlled amount of monticellite, the amount of silica added being based upon a relationship indicated by multiplying by .536 the percentage of lime present in the dolomite for determining the exact amount of silica necessary to yield calcium orthosilicate, and then adding an additional 0.15% of silica for each per cent of monticellite desired in the end product; making up two batches of starting materials based upon the foregoing wherein the monticellite to be yielded in one batch will not exceed 15% and be greater than the percentage of monticellite of the other batch; heating each batch to a temperature of at least 2950° F. until there is yielded periclase, calcium orthosilicate and monticellite; separately grinding and screening the batches to a predetermined mesh size, mixing together a quantity of each batch of ground and sized material, pressing the mixed material into shapes, and ultimately firing the shapes at a temperature of at least 2950° F.

9. The process of making refractory material which comprises treating separately two batches of magnesitic and silica starting materials, heating each batch to yield a clinker comprising at least periclase plus calcium orthosilicate from one batch and a clinker from the other batch comprising at least periclase plus monticellite, mixing proportions of each batch of clinker so that in the mixture there is the desired percentage of periclase, calcium orthosilicate and monticellite desired for service purposes, and firing said mixture.

10. The process of making refractory material which comprises treating separately two batches of magnestitic and silica starting materials, heating each batch to yield a clinker comprising periclase plus calcium orthosilicate plus monticellite from one batch and from the other batch a clinker comprising at least periclase plus monticellite, the percentage of monticellite yielded in one batch being controlled so that it is less than the percentage thereof in the other batch, mixing proportions of each batch so that in the mixture there is the percentage of periclase, calcium orthosolicate and monticellite desired for service purposes, and firing said mixture.

11. The process according to claim 10, wherein the percentage of monticellite yielded in one batch does not exceed 6% while the percentage of it in the other batch is more than 6% and does not exceed 30%.

GILBERT E. SEIL.